United States Patent Office 3,473,390
Patented Oct. 21, 1969

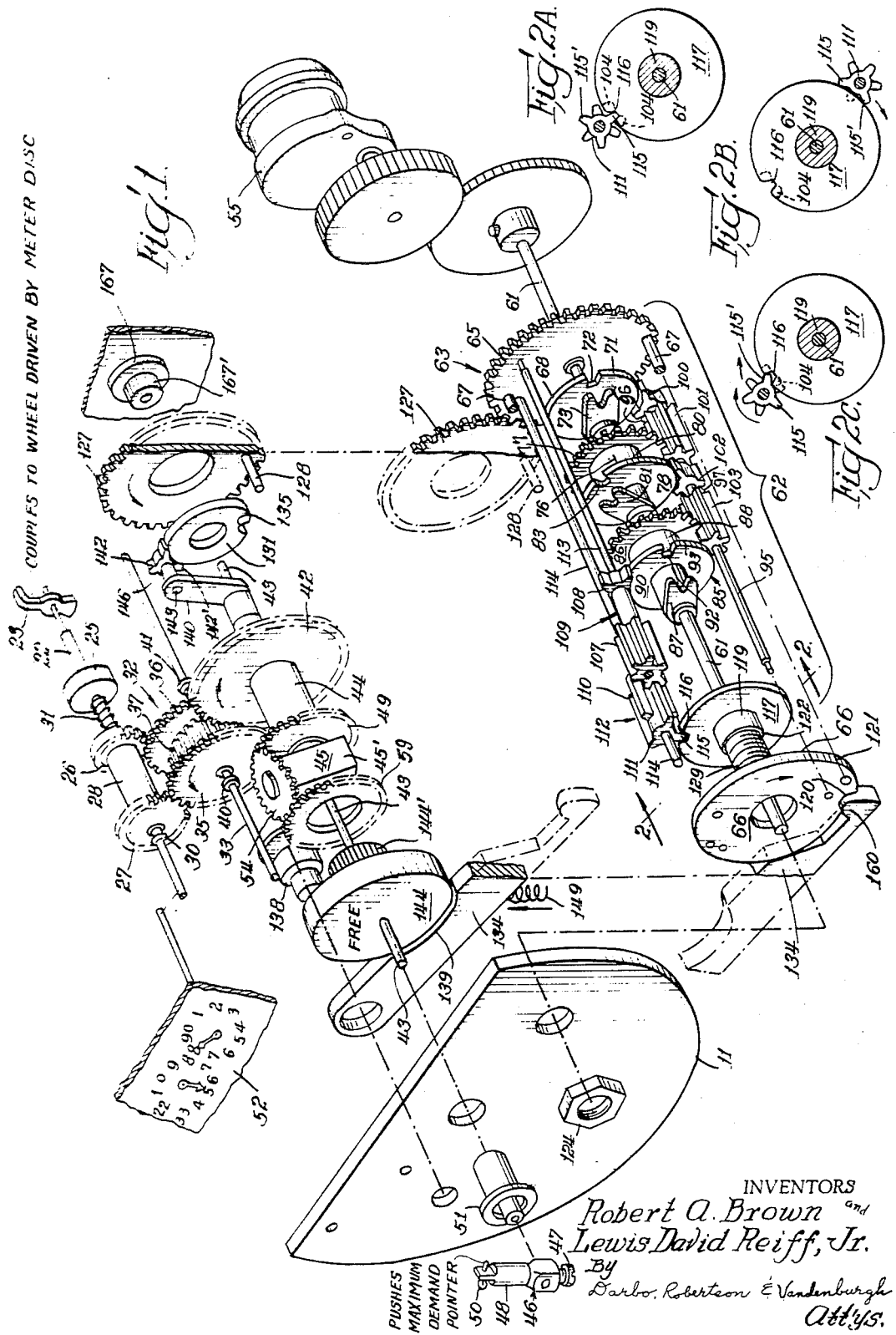

3,473,390
BLOCK INTERVAL DEMAND REGISTER
WITH GENEVA RESET
Robert A. Brown, Mattapoisett, Mass, and Lewis D. Reiff, Jr., Springfield, Ill., assignors to Duncan Electric Company, Inc., a corporation of Indiana
Continuation-in-part of application Ser. No. 567,679, July 25, 1966. This application July 24, 1968, Ser. No. 747,338
Int. Cl. F16h 37/12, 35/18; G01r 19/16
U.S. Cl. 74—1                    6 Claims

ABSTRACT OF THE DISCLOSURE

The means for timing block intervals of a maximum demand watt-hour meter and resetting its pusher includes a multistage Geneva mechanism the first stage of which is driven by a synchronous motor. As the last stage completes a revolution, it simultaneously locks to the supporting cage by which the Geneva mechanism is carried and releases the cage for rotation. At the end of one revolution, the cage relocks and the last stage is released for the cycle to be repeated. During the one revolution, the cage turns the reset mechanism one revolution. This mechanism includes a reset pin which orbits one revolution, the pusher being released from it by a Geneva type device as the "zero" point is approached. The pusher is advanced during the timed interval by a differential gear system, one side gear being held stationary during the measured time interval by a brake, but being freely rotatable during the resetting operation.

RELATED APPLICATION

This application is a continuation-in-part of our copending application Ser. No. 567,679, filed July 25, 1966.

BACKGROUND OF THE INVENTION

This invention relates to electricity demand meters. More particularly, it relates to a mechanical maximum demand register of the block interval type.

Suppliers of electrical energy compute their charges on the basis of the total amount of energy consumed over a relatively long period of time, such as a billing period of one month, and also upon the maximum rate of consumption, or the "demand" of the same consumer. The charge increases per kilowatt-hour to a consumer having a relatively inconsistent demand because of the necessity of the power companies to install equipment capable of handling the maximum demand. More capital equipment is required to serve a consumer if his peak is high, than if he used the same total energy but with a lower peak.

This invention concerns itself with providing a new and improved block interval maximum demand register, either as a separate unit or combined with a kilowatt-hour register. Such a unit measures the amount of power used by a consumer during each successive relatively short predeterimned period of time or "block interval," and indicates the power consumed during that one time interval in the billing period during which the greatest amount of power was consumed. This value is then read at the end of each billing period to determine a rate for use in the computation of the consumer's bill.

During the first timed interval of a billing period, a maximum demand pointer, which forms a part of the demand register, is advanced in proportion to the quantity of electrical energy used. The mechanism includes a pusher element that advances the pointer by pushing against it, and leaves the pointer at its position of maximum advance when the pusher is returned to zero at the end of this first (and each) interval of time. All timed intervals have the same duration such as 15 or 30 minutes. For each succeeding interval, the pusher again advances from its zero position but does not advance the pointer unless the demand for this interval exceeds the demand already indicated thereby. Thus, the pointer will always indicate the maximum demand, i.e., the power consumed during that particular timed interval during which power consumption was the greatest. At the end of the billing period, the meter reader notes and records the maximum demand indicated by the pointer, and he then returns the pointer to zero to initiate the succeeding billing period.

Mechanisms previously proposed or used which accomplish the foregoing results have been found to have distinct disadvantages.

In one type of prior demand register, the zero position of the pusher is determined by a fixed stop which is struck by the pusher or a part directly connected to the pusher. This is objectionable in either of two respects. If the reset is motor driven, a fixed stop could cause jamming and stall the motor, unless a spring release of some sort is used; and a spring release has objections of its own. If the reset is not by motor drive but by a spring or other bias, the snap-action of such a return tends to cause a bounce away from the stop with the result that the pusher comes to rest slightly above zero instead of at zero. Furthermore, all resets due to mere bias have an inherent disadvantage in lack of reserve torque. If the reset is by positive motor drive, the motor can operate at very light loads, ordinarily, and yet have a high reserve of torque, if it should be needed to overcome some momentary high friction such as might result from a speck of dirt in the gear train. The lack of any reserve torque in a bias-return necessitates providing a relative strong bias against which the forward drive must operate, and which increases the bouncing tendency, and wear. In some registers, the zero or stopping point shifts with age because of wear, especially if wear on numerous parts can be cumulative.

According to the present invention, the zero position is determined without the use of a fixed stop, and without zero shift over a long life; and the return is of the positive, motor driven type. Dependable accuracy is achieved, even with a reasonably fast reset, by a device which causes a smooth deceleration to zero velocity at the termination of the reset, as the zero position is reached. Moreover, because of a special brake-release feature which is part of this invention the demand meter registers only during the timed period, and not during a variable part of the reset period.

As compared to prior registers which are more comparable in performance to the present register, the present invention has advantages in the nature of economy and simplicity of manufacture. For example, the intermittent drive unit is one which can be preassembled, and inserted as a unit without danger of the parts losing their proper relationship. Furthermore, a Geneva-type multi-stage exponential intermittent drive device has been developed which, with a relatively small number of parts, can provide both the timing function and the transmission of a single revolution output of suitable speed at the end of the timing operation.

SUMMARY OF THE INVENTION

The maximum demand meter includes the usual pusher which is driven by the disc of a watt-hour meter for a measured interval of time such as fifteen minutes and is then reset to "zero," leaving the push element, such as a maximum demand sweep hand at its point of farthest advance. The means for timing and resetting includes a multistage Geneva mechanism the first stage of which is driven by a synchronous motor. As the last stage completes a revolution, it simultaneously locks to the supporting cage by which the Geneva mechanism is carried and releases the cage for rotation. At the end of one revolution, the cage relocks and the last stage is released for the interval timing cycle to be repeated. During the one revolution, the cage turns the reset mechanism one revolution. This mechanism includes a Geneva-like mechanism and a reset pin which rotates concentrically with it for one revolution. In the course of this revolution, the pin engages the outsanding arm of a three-arm planetary pinion, the other two arms of which are riding on the edge of a disc, preventing movement of the pinion except along the disc. As the "zero" point is approached, one of these arms dips into a Geneva slot allowing the pinion to rotate about its own axis enough to allow the reset pin to slip past the arm it has been pushing, this escape point determining the "zero" position. The Geneva pinion or rider is carried by a crank arm on a shaft which also carries the pusher, both being rigid with the shaft. This pusher shaft is rotated during the timed interval by a counterbalanced crank arm attached thereto. The crank arm is part of a differential gear system and it carries a planetary gear mounted rotatably about an axis longitudinal of the crank arm. The planetary gear enmeshes with a front and rear side gear, both of which may be freely rotated around the pusher shaft. The rear side gear of the differential gear mechanism is driven by the meter disc. The front side gear is held stationary during the measured time interval by a brake, but is freely rotatable during the resetting operation. Advance of the first side gear while the second side gear is stationary causes the advance of the crank arm carrying the planetary gear and thus advances the pusher element. The initial movement of the timing cage releases the brake and the second side gear thus permitting the crank arm to reverse direction during resetting operation without imposing a substantial load on the drive train for the integrating register which is being driven by the meter disc. Since the release of the brake effectively disconnects the pusher from the drive train, the demand meter measures only during the timed period.

DESIGNATION OF THE FIGURES

FIGURE 1 is an exploded perspective view of one form of the invention chosen for illustration, the front to rear distance being elongated to permit an additional spacing of components for clarity of illustration.

FIGURES 2a, 2b, and 2c are cross sectional views of portions of the cage release mechanism taken substantially along the line 2—2 in FIGURE 1.

FUNDAMENTALS OF MAXIMUM DEMAND METERS

In a maximum demand meter, a pointer (not shown) is a maximum demand readout indicator which is readable in conjunction with a circular scale (not shown) along which the tip of the pointer moves. This pointer has a maximum angular travel of less than one full revolution. At the end of each billing period, for example, once a month, the meter reader notes the reading of this pointer and then restores it back to a zero position on the scale to initiate the succeeding billing period.

After the pointer has been restored to zero, it will initially be advanced by pusher 46 which is driven forwardly (by a mechanism including a gear train) by rotation of a coupling 23 which is driven by another mechanism including the meter disc or rotor (not shown). This same disc drives an additional register 52 to indicate the total energy use in terms of kilowatt-hours.

The initial forward drive of the pointer continues only through one "block interval." the duration of the block interval, e.g. 15 minutes, 30 minutes or an hour, may be chosen by regulatory authority, and the timing devices correspondingly designed. The block intervals are equally timed by a synchronous motor 55. At the end of each block interval, something must be done to reset the pusher 46 back to its zero position, so as to begin measurement for a new block interval. The pusher 46 leaves the maximum demand pointer at the maximum position it attained during the interval. At the beginning of each successive demand interval, the driven coupling 23 again begins driving pusher element 46 which must not advance the pointer unless and until the pusher element catches up with the otherwise stationary pointer. Thereafter, until the interval is terminated by the timing motor 55, the disc continues to measure the demand in each interval, advancing the pointer only when the power consumed during the interval exceeds the value already indicated by the pointer.

The present invention is concerned with providing a relatively simple and reliable mechanism for accomplishing the foregoing with dependable exactitude of the resetting operation.

GENERAL EXPLANATION OF INTERMITTENT DRIVE MECHANISM AND RESET

According to the present invention, the block interval reset is accomplished by a driving force derived from the timing motor 55. This is very desirable, inasmuch as such motors, although operating normally against very light loads, are free from a snap-action that can cause inaccuracies, and can provide great increases of torque. This could become necessary to overcome an unusual increase in friction, such as might be due to the presence of a speck of dirt or the accumulation of foreign material such as dust. Reset is accomplished with the aid of an intermittent drive mechanism 62 in conjunction with the reset mechanism driven by it. Intermittent drive mechanism 62, according to the preferred form of the present invention, is of an improved multi-turn form embodying the Geneva principle.

During the block interval, timing motor 55 drives a reset input shaft 61 which in turn drives internal portions of intermittent drive mechanism 62. These internal portions are designed to rotate during the timed interval without causing any effect external thereto, thus taking up play (or "idle motion") until all of the internal play is consumed. In the illustrated form, this lost motion is 100 turns of shaft 61. The length of time it takes to consume this lost motion is the length of time for one demand interval. Upon using up this internal play, the entire intermittent drive mechanism 62, including its outer cage portion 63, is inherently locked together as a unit to the reset input shaft 61 and rotates therewith for exactly one revolution, at the end of which time it again stops in its initial orientation to begin the succeeding interval. This rotational movement of the cage 63 accomplishes the reset of pusher element 46 through mechanism including an arm wheel 127, arm 140, shaft 43 and stationary annular member 131. After pusher 46 reaches its zero position, the watt-hour meter again begins advancing it proportional to the consumption of electrical energy while the intermittent drive mechanism 62 times the interval. Rotational movement of the cage 63 also immediately stops the advance of pusher element 46 and dissipates forwardly-driving forces during the reset period through mechanism including a brake 144, and differential gears 54 and 59.

DESCRIPTION OF WATT-HOUR METER CONNECTION

Referring now to the drawings in more detail, the demand register (comprising most of the upper portion of FIGURE 1) is conventionally driven by a watt-hour meter rotor or disc which is not shown since it constitutes no part of this invention. The angular velocity of the meter rotor is proportional to the consumer's use of power, and this angular movement is transmitted to the demand register input through a simple gear train (not shown) which in turn drives a coupling element 23.

REGISTER INPUT GEAR TRAIN

The demand register includes a separate set of support plates forming a chassis including a front plate 11 (and a rear plate which is omitted for the purpose of clarity) in which are mounted a plurality of shafts. Included among these shafts is a power consumption input shaft 22 carrying a dog 23 at its rear end for connection into the driving elements (not shown) as the register is attached to the main meter frame (not shown). Dog 23 drives shaft 22 having gear 25 fixedly secured thereto which provides a drive to the kilowatt-hour register 52 that indicates the total number of kilowatt-hours consumed over the billing period. When a two-speed gear ratio is provided, input shaft 22 carries a pair of gears 26 and 27 rigidly connected together by means of a common collar 28. Gears 26 and 27 are normally constrained to rotate with shaft 22 by virtue of a friction coupling therewith consisting of a friction element 30 against which the hub of gear 27 is pressed by a friction spring 31. Friction element 30 is shown out of contact with gear 27 for clarity, whereas in fact they would be touching.

Gear 27 drives a compound idler gear assembly 32 which is rotatably mounted on an idler gear shaft 33 fixedly mounted at each end in the demand register chassis. Idler gear assembly 32 includes front and rear gears 35 and 36, respectively, separated by a smaller diameter and relatively elongate gear 37. Front and rear thrust washers 40 and 41 (shown spread out and also out of contact with assembly 32 for clarity of illustration) are provided on idler gear shaft 33 to permit the positioning of idler gear assembly 32 in either a front or rear position. As shown in FIGURE 1, idler gear assembly 32 is in its front position (where it would normally abut thrust washer 40) which permits an input drive from gear 27 through gear 35 with gears 26 and 36 out of mesh. When in its rearmost position, idler gear assembly 32 abuts thrust washer 41 and is driven by gear 26 which is in mesh at that time with gear 36. The particular drive used depends upon the anticipated consumption of the consumer which thereby permits the same demand register to be installed in the establishments of a variety of consumers which may have widely varying power demands. Of course, a differently calibrated kilowatt-hour scale is used with each of the two positions of the idler gear assembly.

Driven by elongate gear 37 is a gear 42. Gear 42 remains in mesh with elongate gear 37 of idler gear assembly 32 regardless of whether the idler gear assembly 32 is positioned in its forward or rearward position. Gear 42 is mounted on hub 44 which in turn is freely rotatable around pusher shaft 43.

Also mounted on hub 44 is the rear side gear 49. Hence gears 49 and 42 are fixed with respect to each other by the hub 44, causing these three elements to rotate freely about the shaft 43 as a unit when gear 42 is driven by the gear 37. The teeth of the rear differential gear 49 engage the teeth of planetary gear 54 which is rotatably mounted on the end of crank arm 45. Shaft 43 and the parts mounted thereon should be balanced about the shaft axis and to this end may have a counterbalance portion 45' fixed to shaft 43. As the crank arm rotates, the pusher element 46 rotates also. Planetary gear 54 also engages front differential gear 59, which in turn is fixed to brake wheel 144.

Hence, when brake wheel 144 prevents front differential gear 59 from rotating, the revolution of gear 49 and gear 54 causes rotation of crank arm 45, shaft 43, and pusher arm 46. If brake wheel 144 and front differential gear 59 are free to rotate, rear differential gear 49 can continue to rotate without causing advance in crank arm 45, thereby disspating the forwardly-driving forces which continue to be transmitted to gear 49. Hence, at the moment the brake wheel 144 is free to rotate, the pusher arm 46 no longer advances. Also, during reverse (i.e. reset) rotation of the pusher arm 46, crank arm 45 also reverses. However, the release of the front gear 59 permits the crank arm 54 to reverse without imposing substantial forces on advancing gear 49.

A set screw 47 is provided to lock the pusher 46 onto pusher shaft 43 at the desired angular orientation. Pusher element 46 comprises an arm 48 carried by and extending transversely outwardly from pusher shaft 43, and arm 48 carries an adjustment screw 50 therein at its outer end.

Supporting pusher shaft 43 near its front end is a collar 51 which is rigidly connected to the register chassis. Collar 51 pivotally carries thereon a pointer or indicator (not shown). This indicator is provided with means, such as a frontwardly extending tab (not shown) to permit the adjustment screw 50 on pusher 46 to angularly advance the indicator over a scale (not shown). It will be noted that pusher 46 only engages and advances the pointer 52 when moving generally clockwise, as viewed in FIG. 1, and counterclockwise movement of pusher 46 does not change the already established position of the pointer.

The mechanism described up to this point has been concerned principally with advancing the pointer in proportion to the power consumed, and this mechanism is continuously driven forward by the coupling dog 23 as long as power is used by the consumer. At the end of some predetermined interval of time, it is necessary to reverse the movement of pusher 46 back to its initial or starting position in order to measure the power consumed over the succeeding interval. The mechanism which permits this return movement or "reset" will be described next.

INTERMITTENT DRIVE MECHANISM

We will see that the reset operation is accomplished by turning driving gear 127 one revolution. This requires one revolution of gear 65. Accordingly, it is desirable to drive gear 65 one revolution at the end of each block interval. This revolution should be at a fairly good speed so that the time lost to demand measurement between intervals will not be execessive. This needed quick revolution of gear 65 at the end of each demand interval is accomplished by means of the intermittent drive mechanism drive 62. A major part of this mechanism is cage 63, which includes drive gear 65 at one end, notched wheel 66 at the other end, and spacing rods 67.

The constantly driven shaft 61 extends through the cage 63 of drive mechanism 62, but has secured to it only a first stage Geneva rotor, comprising disc 68 and two-toothed segment 73. Disc 68 has a circular edge 71 interrupted by a notch 72. During most of each revolution of this rotor the remaining parts of the intermittent drive mechanism 62 are held stationary by virtue of the fact that the disc 68 nests between two widely spaced teeth of a three-toothed pinion 100, holding that pinion from rotating. That pinion and a second pinion 101 jointly form a pinion pair 96 which is freely rotatable as a unit on shaft 95. Pinion 101 has twice as many teeth as pinion 100 and meshes with gear 77 of second stage rotor 76, thereby holding this rotor stationary. Rotor 76 consists of two-toothed segment 81, disc 78 and gear 77, all fixed to stepped hub 80, which, in turn is freely rotatable around shaft 61. When disc 78 nests between two widely spaced tooth of three-toothed pinion 102, that pinion is stationary. Pinion 102 and pinion 103 make up a second stage pinion pair 97 like pair 96. Pinion 103 has twice as many teeth as pinion 102 and meshes with gear 86 of rotor 88, holding it stationary at this time.

During each revolution of disc 68, as its notch 72 moves into position to receive a tooth of pinion 100, the two-toothed segment 73 moves into mesh with pinion 101 and turns it through an angularity corresponding to the angularity occupied by two teeth of pinion 101. Gear 77 has 20 teeth and this therefore turns gear 77 one-tenth of a revolution. The entire rotor 76 moves with gear 77, including steped hub 80, disc 78 and two-toothed segment 81 on successive seats of hub 80. During one step in each revolution of rotor 76, two-toothed segment 81 passes through an arc of engagement with the pinion 103 while notch 83 receives a tooth of pinion 102. Pinion 103 accordingly drives gear 85 one-tenth of a revolution during every tenth revolution of first stage rotor 68.

As two-toothed segment 73 makes its one-hundredth pass in mesh with pinion 101, final stage rotor 85 moves through its tenth step to complete its revolution. Its stepped hub 88 (which is freely rotatable around shaft 61), two-toothed segment 87, notched disc 90 with its notch 92 all move together, and, as we will see, cause a temporary locking up of the Geneva parts to front cage plate 66, during the middle of this movement so that for one revolution the shaft 61 is connected to drive the entire cage assembly 63.

Except during this one revolution of drive, the cage 63 is held from rotation because, as illustrated in FIGURE 1, the three-toothed pinion 108 is restrained from rotation. Pinion 108 is fixed to six-toothed pinion 107 forming pinion pair 109, which is rotatably mounted on shaft 113. Pinion 107 meshes with rear pinion 110 of pinion pair 112 which is rotatably mounted on shaft 114. The front pinion 111 of pinion pair 112 has three teeth; the rear pinion 110 has six teeth. Tooth 115 of pinion 111 resides in notch 116 of stationary disc 117 during the timed period. Since pinion 108 cannot rotate during the timed portion of the demand sequence, neither can pinion pairs 109 and 112; therefore, tooth 115 of pinion 111 is likewise restrained within notch 116 thereby preventing the cage 63 from rotating around stationary piece 117. Completion of the revolution of final stage rotor 85 brings the two-toothed segement 87 into engagement with six-toothed pinion 107, notch 92 at the same time reaching a position to permit pinion 108 to turn. As pinion 107 is turned the cage is unlocked from its fixed position and is simultaneously locked into a driven relationship with revolving shaft 61.

The stationary disc 117 is mounted on hub 119 inside of which shaft 61 freely rotates and around which the cage and plate 66 may freely rotate. The shoulder 122 on hub 119 bears against the front plate 11 and is secured immovably thereto by pressure generated by tightening of a nut 124 on the threaded portion 129 of the hub 119.

The cage end plate 66 is of the nature of a cam. It has a rounded notch 120 and a substantially circular edge surface 121.

The lever arm 134 is rotatably mounted on axle hub 138, which in turn is secured to front plate 11 by a forwardly projecting stud. The lever arm 134 has a brake seat 139 which bears against brake wheel 144. The brake wheel 144 has a hub portion 144' which may be freely rotated around shaft 43. Front differential gear 59 is fixed to hub 144'. Resilient means 149 for maintaining pressure of the brake seat 139 against wheel brake 144 is shown schematically in FIGURE 1. The lever arm 134 has a cam follower portion 160 which resides in notch 120 during the timed period, but iis held from seating therein by engagement of brake seat 139 on brake wheel 144. When the cage 63 begins its rotation at the end of the timed period, cage end plate 66 rotates with it. The side of notch 120 then engages follower 160 and cams it outwardly, causing lever arm 134 to be depressed. This depression of the lever arm 134 causes it to disengage from brake wheel 144. Because follower 160 is more remote from axle hub 138 than is brake seat 139, a light pressure on the follower 160 is sufficient. Upon the release of brake wheel 144 the entire unit consisting of brake wheel 144 and front differential gear 59 become freely rotatable around the shaft 43.

RESET MECHANISM

The gear 65 is in mesh with the gear 127 which is freely rotatable about the hub 167. The finger 128 on gear 127 can engage the radially extending tooth 142 of three-toothed pinion 146. The pinion 146 is freely rotatable around the shaft 143, shown at the front surface of arm 140. As the finger 128 engages the radially extending tooth 142 during the rotation of gear 127, the pinion 146 is pushed around the circumference of circular notched disc 131 which is fixed with respect to the meter chassis by its attachment to surface 167' of stationary hub 167. As the pinion 146 revolves around the fixed piece 131, arm 140 rotates counterclockwise with it thus rotating in reset direction shaft 43 and pusher element 46, which is also attached to shaft 43.

OPERATION OF THE RESET MECHANISM

During the timed period shaft 61 makes 100 revolutions thereby taking up all the slack or lost motion within the section marked 62 of FIGURE 1. During its one-hundredth engagement of first stage segment 73 with its pinion 101 movement is transmitted to rotor 85, so that its notch 92 moves into position to receive one of the teeth of pinion 108, and two-toothed segment 87 moves into engagement with pinion 107. As two-toothed segment 87 moves halfway through its path in mesh with pinion 107 the following occurs:

(1) The cage 63 begins to rotate,
(2) The brake arm 134 is depressed, and this causes the demand meter to be disconnected from the influence of gear 49, and
(3) The pusher reset mechanism goes into operation.

These three operations which are, of course, related and which take place at the moment of the completion of the one-hundredth revolution of shaft 61 will now be discussed in detail in the following sections which are numbered to correspond with the numbers set forth immediately above.

(1) Rotation of cage

Pinion 112 rotates causing its tooth 115 to move out of notch 116. This releases the cage from its engagement with the fixed disc 117 making the cage freely rotatable around shaft 61. However, the partial rotation of pinion 112 causes its next tooth to strike the edge of piece 116 thereby preventing further rotation of pinion 112. This is illustrated in FIGURES 2a, 2b, and 2c. In FIGURE 2a tooth 115 is shown residing in notch 116. As the pinion 111 rotates, the next tooth 115' strikes the edge of stationary circular piece 117 thereby preventing further rotation of pinion 111 around is own axis. This in turn prevents further rotation of pinions 107 and 108 about their axis as seen in FIGURE 1, locking these elements in mesh with 87 and 85, respectively. Hence the entire cage mechanism is now free to rotate with shaft 61 and is moreover locked to that shaft since the entire cage mechanism is in mesh and therefore locked to rotor 68 which is fixed to shaft 61. The driving force imparted by shaft 61 now causes the entire cage 63 to rotate around the shaft. As the cage rotates, pressure of the teeth 115–115' against the circumference of stationary circular piece 117 prevents rotation of the pinion 111 as seen in FIGURE 2b. Hence during this entire revolution of the cage pinion 111 is unable to rotate around its own axis. However, as seen in FIGURE 2c pinion 111 is permitted to complete its cyclic fractional turn at the completion of the single cage revolution when tooth 115' drops into notch 116. It is preferred that the fixed disc 117 be fitted with ears 104 adjacent to notch 116 for engaging teeth of pinion 112. This assists in the rotation of that pinion as shown in FIGURE 2c. Hence during the rotation of the cage, pinion 112 is restrained from rotation around its own axis and the cage is locked onto shaft 61. However, when tooth 115 of pinion 111 drops into notch 116 that pinion completes its cyclic rotation thereby turning pinions 107 and 108. This causes rotation of the tooth of pinion 108 which resides in notch 92 of notched disc 90 while the cage mechanism 62 is locked to shaft 61. As soon as the tooth of pinion 108 leaves the notch 92 the notched wheel 90, hub 88 and gear 86 are free to rotate to complete their fractional turn. This also returns pinions 112, 107 and 108 to the position which locks the cage to fixed position with respect to stationary wheel 117, and yet permits gear 86 and notched disc 70 to rotate during the timed period.

(2) Operation of the brake

At the moment the cage mechanism 62 begins to rotate the cage end plate 66 rotates with it. Its rotational motion forces the lever arm 134 downward until the follower portion 160 leaves the notch 120. During the revolution of the cage 63 and end plate 66, the follower portion 160 rides on the circumference 121 of end plate 66. Consequently at the moment the cage begins to rotate the brake lever arm 134 is depressed and moved out of engagement with brake wheel 144, therefore at the moment at which the timed period ends and the cage mechanism 62 begins to rotate the front differential gear 59, which is fixed to brake wheel 144, becomes freely rotatable around the shaft 43. As explained above, the continuous forward rotation of gear 42 and rear differential gear 49 can act to advance lever arm 45 (and with it pusher element 46) only while the front differential gear 59 is fixed. As soon as brake 144 and front differential gear 59 become freely rotatable about shaft 43 the rotational action of planetary gear 54 will not advance arm 45. Consequently, because of this unique arrangement of elements the advance of pusher 46 is terminated at the moment the timed period ends. This provides a distinct advantage as will be appreciated more hereinafter insofar as the pusher element 46 advances only during the precisely timed periods and not through part of the reset cycle.

(3) Pusher reset mechanism

As soon as the cage mechanism 62 begins to rotate gear 65 causes the rotation of gear 127 and the rotational advance of finger 128. It will be appreciated from FIGURE 1 that during the reset cycle the finger 128 will rotate freely through a portion of the revolution without engaging the pinion 146. Hence to be precise, the actual resetting of pusher element 46 does not begin until the reverse rotation of arm 140 begins. It will be appreciated from FIGURE 1 that the reverse rotation of arm 140 does not begin until the finger 128 has completed a portion of this revolution and engages pinion tooth 142. Hence the delay between the precise end of the timed period and the moment at which the pusher element 46 begins its rotation to the zero has theretofore been an error in the timed period. Furthermore the amount of this error varied according to how advanced the pusher 46 and pinion 146 happened to be. Because of the unique combination of elements the forward motion of the pusher element is terminated, as explained in numbered section 2, above, at the very end of the timed period and the time lost between the end of the timed period and the engagement of finger 128 with tooth 142 no longer constitutes an error in the timed period. As gear 127 completes its revolution finger 128 pushes three-toothed pinion 146 towards notch 135 on the stationary piece 131. Upon the completion of the revolution of finger 128 the leading tooth 142′ drops into notch 135 thereby permitting the finger 128 to pass over the pinion 146. As soon as tooth 142′ drops into notch 135 the rotational motion of arm 140 terminates and with it the rotational reset action of pusher 146 terminates also.

Hence upon the completion of the rotation of the cage mechanism 62, the finger 128 has completed one revolution and no longer engages the pinion 146 thereby permitting that pinion to return along its path around fixed piece 131 as the pusher element 46 advances. Also, at the moment the gear cage 63 completes one revolution the follower element 160 in lever arm 134 reseats in the notch 120 of that plate. This, of course, permits the resilient means 149 to cause the seat 139 to again bear against the brake wheel 144 thereby preventing further rotation of that wheel and front differential gear 59. Consequently, at the moment the cage ceases to rotate during the reset action the front differential gear 59 against becomes locked thereby permitting the continuous advance of the gear 49 to again cause the advance of crank arm 45 and with it pusher element 46.

It is to be noted that the position of the pointer is not affected during the return movement of pusher 46. Thus during each succeeding interval pusher 46 will merely initially advance toward the point of contact with the pointer. Only if the power consumed during a succeeding interval exceeds the power consumption already recorded by the pointer will the pointer be engaged by the pusher so as to cause its advance. In this way the block interval demand register keeps an indication only of the maximum demand, i.e., the power consumed during that timed interval in the billing period during which the power consumption was the greatest. At the end of the billing period the meter reader notes this value and returns the pointer (not shown) to its zero position on the block interval demand register readout scale. It is noted that manual depression of the lever arm 134 during the resetting of the pointer disconnects the pusher element from the register input gear train.

ACHIEVEMENT

From the foregoing it is seen that an exceptionally dependable and reasonably simple timed reset device for block interval demand pushers has been provided. The reset is motor driven and therefore has reserve torque and no bounce. It has withstand accelerated life testing without detectable zero shift. The timing unit permits a fixed number of idle turns and then transmits positive drive at a desired speed. Moreover, during the period of the reset drive the advance of the pusher element is immediately terminated thereby providing great precision and consistency in the timing of the timed period. Moreover, the drive which causes the resetting of the pusher element to zero is not transmitted into the register input gear train. Nonetheless the block interval demand register of this invention can be assembled economically and is quite compact.

We claim:

1. An intermittent drive device for producing an output consisting of a single rapid and exact rotational movement after a given number of revolutions of a constantly driven shaft characterized by a Geneva mechanism having a rotatable output element, an input element constantly rotatable with said shaft, Geneva transfer means actuated by the input element, an output control pinion, a terminal actuator periodically moved by the transfer means into a driving relationship with said pinion after a predetermined number of timing revolutions of said input member, stationary output element-restraining means engaging said pinion during said timing revolutions, said output element-restraining means including means for partially rotating said pinion when the pinion engages or disengages the element, first pinion-restraining means, including a portion moving with the terminal actuator, for restraining said pinion from rotation on its axis during said timing revolutions thereby preventing movement of the output element, said first pinion-restraining means periodically connecting said pinion and said terminal actuator in a driving relationship whereby said pinion is rotated on its own axis, and second pinion-restraining means for restraining said output control pinion from further rotation on its axis after it has been rotated sufficiently by the terminal actuator to free itself from said stationary output-element restraining-means, thereby permitting the output element to rotate until said pinion again engages stationary output element-restraining means, and is rotated on its own axis after the output element rotates through a predetermined arc, whereby the rotation of the pinion moves the first-pinion-restraining means to release the terminal actuator therefrom.

2. An intermittent drive mechanism for providing an idle motion drive over a specific interval and including an input shaft, a mounting structure rotatably mounted on said shaft, Geneva means for providing limited idle motion between said shaft and said mounting structure, said Geneva means including a driving portion driven by said shaft and a driven portion mounted on said mounting structure for rotation relative thereto, restraining means for preventing rotation of said mounting structure during consumption of said idle motion, means responsive to said driven portion after said idle motion is consumed for effecting release of said restraining means, and lock means responsive to said driven portion upon disconnection of said restraining means to cause said mounting structure to rotate with said input shaft.

3. The mechanism according to claim 2, including means for disconnecting said lock means from said driven portion after one revolution of said mounting structure and causing said restraining means to reengage said mounting structure and restrain further rotation thereof, whereby said driven portion is released from driving contact with said mounting structure and said Geneva means begins measuring a new idle motion interval.

4. An intermittent drive device for producing a single rapid and exact revolution after a given number of revolutions of a constantly driven shaft characterized by a Geneva mechanism having a rotatable output element, an input element constantly rotatable with said shaft, Geneva transfer means actuated by input element, an output control pinion, a terminal actuator moved by the transfer means into mesh with said pinion after a predetermined number of timing revolutions of said input member, stationary tooth means engaging said pinion during said timing revolutions, means moving with the terminal actuator for restraining said pinion from rotation on its axis during said timing revolutions and thereby preventing movement of the output element, and means for restraining said pinion from rotation, after it has been rotated sufficiently to free itself from said stationary tooth means, until said pinion is passing into control of the first-named restraining means to be again restrained thereby when it has returned to its original planetary position after exactly one planetary revolution.

5. An intermittent drive device for producing a single rapid and exact angular movement after a given number of free revolutions of a constantly driven shaft characterized by a Geneva mechanism having a rotatable output element, an input element constantly rotatable with said shaft, Geneva transfer means actuated by the input element, an output control pinion, a terminal Geneva unit preventing spin of the pinion during the free revolutions and moved by the transfer means into actuating mesh to move said pinion after a predetermined number of free revolutions of said input member, stationary locking means having a toothed engagement preventing arcuate movement of the pinion while its spin is prevented by the Geneva unit during said free revolutions; and said device also including means for restraining said pinion from spin during output, after it has been rotated sufficiently to lock the Geneva unit and free itself from the locking action of said locking means, but at the end of a predetermined arcuate movement permitting said pinion to turn sufficiently to release the Geneva unit, whereby the Geneva unit again prevents spin of the pinion during another set of free turns.

6. An intermittent drive device for producing a single rapid and exact angular movement after a given number of free revolutions of a constantly driven shaft characterized by a Geneva mechanism having a rotatable output element, an input element constantly rotatable with said shaft, Geneva transfer means actuated by the input element, an output control pinion, a terminal Geneva unit preventing spin of the pinion during the free revolutions and moved by the transfer means into actuating mesh to move said pinion after a predetermined number of free revolutions of said input member, a stationary locking Geneva disk engaging in a notch thereof a tooth of the output control pinion to prevent arcuate movement of the pinion while its spin is prevented by the Geneva unit during said free revolutions; said Geneva disk also having an arcuate portion restraining said pinion from spin during output, after it has been rotated sufficiently to lock the Geneva unit and free itself from the locking action of said Geneva disk, but at the end of a predetermined arcuate movement permitting said pinion to turn sufficiently to release the Geneva unit, whereby the Geneva unit again prevents spin of the pinion during another set of free turns.

References Cited
UNITED STATES PATENTS

| | | | |
|---|---|---|---|
| 1,077,749 | 11/1913 | Porter | 324—103 |
| 2,259,314 | 10/1941 | Lewis et al. | 324—103 |
| 2,593,416 | 4/1952 | Dawson. | |
| 3,406,338 | 10/1968 | Benbow | 324—103 |

LEONARD H. GERIN, Primary Examiner

U.S. Cl. X.R.

74—10.2, 435, 436; 324—103

PO-1050
(5/69)

UNITED STATES PATENT OFFICE
CERTIFICATE OF CORRECTION

Patent No. 3,473,390            Dated   October 21, 1969

Inventor(s)   Robert A. Brown and Lewis D. Reiff, Jr.

It is certified that error appears in the above-identified patent and that said Letters Patent are hereby corrected as shown below:

The title should be "Geneva Device Providing One Revolution at Ends of Intervals It Times".

Column 3, line 10, "outsanding" should be "outstanding".

Column 6, line 64, "tooth" should be "teeth".

Column 9, line 51, "theretofore" should be "heretofore".

Column 10, line 6, "against" should be "again"; line 34, "withstand acelerated" should be "withstood accelerated".

SIGNED AND
SEALED
MAY 19 1970

(SEAL)
Attest:

Edward M. Fletcher, Jr.
Attesting Officer

WILLIAM E. SCHUYLER, JR.
Commissioner of Patents